A. S. CHESTON.
VEHICLE TOP.
APPLICATION FILED JAN. 29, 1920.
1,414,178.
Patented Apr. 25, 1922.
2 SHEETS—SHEET 1.
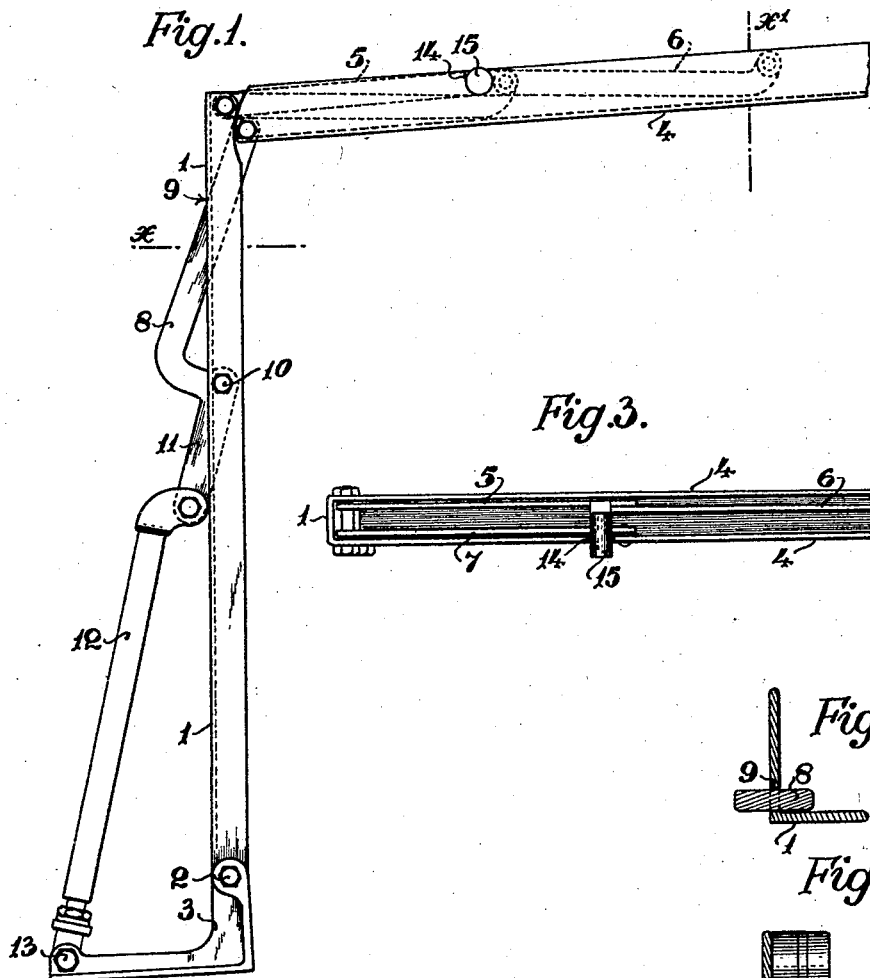

A. S. CHESTON.
VEHICLE TOP.
APPLICATION FILED JAN. 29, 1920.
1,414,178.
Patented Apr. 25, 1922.
2 SHEETS—SHEET 2.
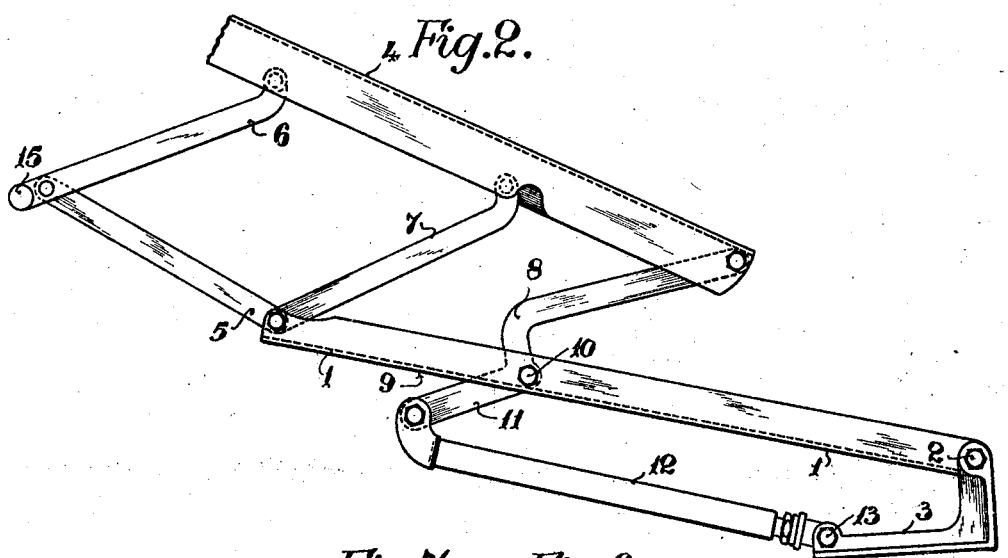
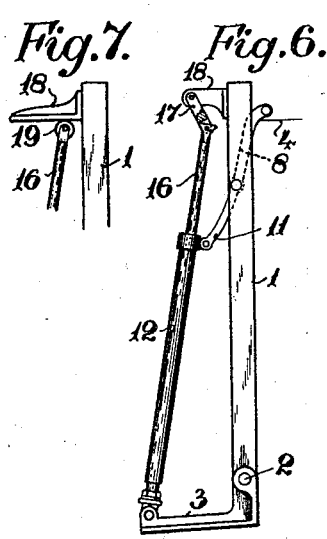
Inventor
Arthur Sam Cheston

UNITED STATES PATENT OFFICE.

ARTHUR S. CHESTON, OF BIRMINGHAM, ENGLAND.

VEHICLE TOP.

1,414,178. Specification of Letters Patent. Patented Apr. 25, 1922.

Application filed January 29, 1920. Serial No. 354,857.

*To all whom it may concern:*

Be it known that I, ARTHUR SAM CHESTON, subject of the King of Great Britain, residing at Birmingham, England, have invented certain new and useful Improvements in Vehicle Tops, of which the following is a specification.

This invention relates to folding hood or head fittings of the cabriolet, landaulette and similar closed types of motor-cars and other vehicles wherein the cant-rails of the head framing are hinged to vertical folding pillars, so that the whole can be folded back and collapsed at the rear of the vehicle; the cant-rails being connected to the said pillars by means of hinged or jointed links, one of which is extended beyond its pivot and connected to a back stay or radius member pivoted to the frame of the vehicle, so that the raising and lowering of the pillar automatically effects the opening out or contraction of the cant-rail.

Heretofore the cant-rail and pillar have generally consisted of wooden members forming integral parts of the head frame, and the links and metal parts have had to be attached to these members and to the vehicle frame by the body builders, the correct fitting of the said parts frequently involving considerable experiments and adjustment of the centres in order to obtain the proper operation of the device to suit the particular design of vehicle.

It has been proposed, however, to construct a hood fitting as a single article or unit complete in itself, ready for attachment to the vehicle, and comprising a vertical pillar bar (to which the wooden pillar can be attached) connected to a horizontal bar (to which the wooden cant-rail can be attached) by means of a link and through the medium of the forward end of a top member pivoted to the pillar bar and to the said cant-rail bar, but no back stay or radius member connected to the link member has been provided in this prior arrangement.

According to the present invention a vertical metal pillar member (to which the wooden pillar can be secured) is connected by links to a horizontal metal cant-rail member (to which the wooden cant-rail can be attached) to form a complete self-contained unit, but in addition a rear stay or radius member is employed connected to one of the links, the lower end of this rear stay and the lower end of the pillar member both being pivoted to a common base or bracket adapted to be attached to the vehicle frame, so that the said rear stay forms a part of the self-contained unit, which can be applied to the vehicle without any adjustment or setting of the centres by the body builders.

The horizontal member to which the cant-rail is to be attached is preferably in the form of a metal channel adapted to enclose the upper link members.

Figure 1 of the accompanying drawings is a side elevation of the improved automatic contracting cant-rail and pillar unit, the same being shown in the position when the head is closed.

Figure 2 shows the positions the parts assume when the head is being folded back and the cant-rail member contracted.

Figure 3 is a plan of the cant-rail member.

Figure 4 represents a cross-section through the pillar member on line $x$, Figure 1.

Figure 5 is a section through the cant-rail member on line $x'$, Figure 1.

Figures 6 and 7 illustrate modifications.

Referring to Figures 1 to 5, the vertical pillar member 1 (to which the wooden pillar is adapted to be secured) consists of a length of angle-iron pivoted at its lower end at 2 to the vertical part of an L-shaped base bracket 3 adapted to be secured to the body of the vehicle by any suitable means. The cant-rail 4, which is adapted to be attached to the head frame by any suitable means, consists of a metal channel connected to the pillar 1 by toggle links 5, 6, and, in addition, by a horizontal link 7 pivoted to the upper end of the pillar, and by a downwardly extending cranked link 8. This link 8 is pivoted to the inner end of the cant-rail and passes through a slot 9 in one of the flanges of the pillar, being pivoted to the latter at 10 and being extended below the pivot in the form of a short arm 11 which is jointed to the upper end of the back stay or radius member 12. The lower end of the said back stay is pivoted at 13 to the rear end of the horizontal portion of the base bracket 3.

The cant-rail 4 encloses the links 5, 6, 7, when the head is extended, and the one side is gapped at 14 to receive the stop piece 15 on the end of the link 6.

It will thus be seen that the whole arrangement forms a self-contained unit which can be readily applied to the vehicle body without any adjustment or setting of the centres.

In the form illustrated in Figure 6, the back stay 12 is pivoted to the same bracket 3 as the pillar 1, as described above, but consists of a tube containing a head-raising spring acting on a telescoping plunger 16 connected by a link 17 to a bracket 18 attached to the rear face of the pillar member, so as to render the head self-lifting; the upper end of the stay 12 being connected to the cant-rail member 4 by the lever link 11, 8.

Or, as shown in Figure 7, instead of the plunger 16 being connected to the pillar member by a link, it may carry a roller 19 bearing upon the underside of a bracket 18 on the pillar.

Having fully described my invention, what I desire to claim and secure by Letters Patent is:—

1. A vehicle top comprising a vertical metallic pillar member to which the wooden pillar can be secured, a horizontally disposed metallic cant-rail member to which the wooden cant-rail can be attached, links connecting said pillar member and cant-rail to form a complete unit, a rigid non-collapsible rear stay member connected to one of said links, and a common base or bracket adapted to be attached to the vehicle frame, said rigid rear stay and pillar members being pivotally connected to said bracket so that the rear stay member forms part of the complete unit ready to be fitted as such to the vehicle body.

2. A vehicle top comprising a vertical metal pillar member, a horizontal channel-sectioned metal cant-rail member, links connecting the pillar member to the cant-rail member said links being adapted to lie within the channel-sectioned cant-rail member, a rear stay connected to one of the links, and a base member to which the lower ends of the pillar member and rear stay are pivoted, the whole forming a self-contained unit.

3. A vehicle top comprising a vertical pillar member, a horizontally disposed cant-rail member, toggle links connecting the pillar member to the cant-rail toward the forward end of the latter, a cranked link intermediately pivoted on said pillar member and pivotally connected at one end to said cant-rail at the rear end thereof, a rear stay pivotally connected to the other end of said cranked link, a link pivotally connected to said pillar member and an intermediate portion of said cant-rail, and a base member to which the lower ends of the pillar member and rear stay are pivoted.

In testimony whereof I have hereunto set my hand in presence of two subscribing witnesses.

ARTHUR S. CHESTON.

Witnesses:
H. N. SHERRETT,
COL. SHERRETT.